(12) United States Patent
Braho et al.

(10) Patent No.: US 8,417,185 B2
(45) Date of Patent: Apr. 9, 2013

(54) WIRELESS HEADSET AND METHOD FOR ROBUST VOICE DATA COMMUNICATION

(75) Inventors: Keith Braho, Murrysville, PA (US); Roger Graham Byford, Apollo, PA (US); Thomas S. Kerr, Murrysville, PA (US); Amro El-Jaroudi, Pittsburgh, PA (US)

(73) Assignee: Vocollect, Inc., Pittsburgh, PA (US)

( * ) Notice: Subject to any disclaimer, the term of this patent is extended or adjusted under 35 U.S.C. 154(b) by 1031 days.

(21) Appl. No.: 11/303,271

(22) Filed: Dec. 16, 2005

(65) Prior Publication Data

US 2007/0143105 A1 Jun. 21, 2007

(51) Int. Cl.
*H04B 7/00* (2006.01)
*G10L 15/16* (2006.01)

(52) U.S. Cl. .................. 455/41.2; 704/275; 704/232

(58) Field of Classification Search ................ 704/232; 455/463, 41.2
See application file for complete search history.

(56) References Cited

U.S. PATENT DOCUMENTS

| | | |
|---|---|---|
| 1,483,315 A | 2/1924 | Saal |
| D130,619 S | 12/1941 | Treslse et al. |
| D153,112 S | 3/1949 | Braun et al. |
| 2,506,524 A | 5/1950 | Stuck |
| 2,782,423 A | 2/1957 | Wiegand et al. |
| 2,958,769 A | 11/1960 | Bounds |
| 3,087,028 A | 4/1963 | Ernest |
| D196,654 S | 10/1963 | Van Den Berg |
| 3,192,326 A | 6/1965 | Chapman |
| D206,665 S | 1/1967 | Sanzone |
| 3,327,807 A | 6/1967 | Mullin |
| D212,863 S | 12/1968 | Roberts |
| 3,568,271 A | 3/1971 | Husserl |
| 3,654,406 A | 4/1972 | Reinthaler |
| 3,682,268 A | 8/1972 | Gorike |
| 3,969,796 A | 7/1976 | Hodsdon |
| 3,971,900 A | 7/1976 | Foley |
| 3,971,901 A | 7/1976 | Foley |

(Continued)

FOREIGN PATENT DOCUMENTS

| | | |
|---|---|---|
| DE | 2628259 | 12/1977 |
| DE | 3604292 | 8/1987 |

(Continued)

OTHER PUBLICATIONS

Lawrence rabiner and biing-hwang juang, fundamentals of speech recognition, Apr. 22, 1993, Prentice Hall PTR, pp. 95-117.*

(Continued)

*Primary Examiner* — Steven Lim
*Assistant Examiner* — Diego Herrera
(74) *Attorney, Agent, or Firm* — Wood, Herron & Evans, LLP

(57) ABSTRACT

A wireless device for use with speech recognition applications comprises a frame generator for generating successive frames from digitized original audio signals, the frames representing portions of the digitized audio signals. An autocorrelation circuit generates a set of coefficients for each frame, the coefficient set being reflective of spectral characteristics of the audio signal portion represented by the frame. In one embodiment, the autocorrelation coefficients may be used to predict the original audio signal to be subtracted from the original audio signals and to generate residual signals A Bluetooth transceiver is configured for transmitting the set of coefficients and/or residual signals as data to another device, which utilizes the coefficients for speech applications.

44 Claims, 3 Drawing Sheets

U.S. PATENT DOCUMENTS

| | | | |
|---|---|---|---|
| 3,984,885 A | 10/1976 | Yoshimura et al. |
| 4,018,599 A | 4/1977 | Hill et al. |
| 4,020,297 A | 4/1977 | Brodie |
| 4,024,368 A | 5/1977 | Shattuck |
| 4,031,295 A | 6/1977 | Rigazio |
| 4,039,765 A | 8/1977 | Tichy |
| 4,090,042 A | 5/1978 | Larkin |
| 4,138,598 A | 2/1979 | Cech |
| 4,189,788 A | 2/1980 | Schenke |
| 4,239,936 A | 12/1980 | Sakoe |
| RE30,662 E | 6/1981 | Foley |
| 4,302,635 A | 11/1981 | Jacobsen |
| 4,335,281 A | 6/1982 | Scott et al. |
| D265,989 S | 8/1982 | Harris |
| 4,357,488 A | 11/1982 | Knighton et al. |
| D268,675 S | 4/1983 | Hass |
| 4,409,442 A | 10/1983 | Kamimura |
| 4,418,248 A | 11/1983 | Mathis |
| 4,471,496 A | 9/1984 | Gardner |
| 4,472,607 A | 9/1984 | Houng |
| 4,499,593 A | 2/1985 | Antle |
| D278,805 S | 5/1985 | Bulgari |
| 4,625,083 A | 11/1986 | Poikela |
| 4,634,816 A | 1/1987 | O'Malley et al. |
| 4,672,672 A | 6/1987 | Eggert et al. |
| 4,672,674 A | 6/1987 | Clough |
| 4,689,822 A | 8/1987 | Houng |
| 4,783,822 A | 11/1988 | Toole et al. |
| D299,129 S | 12/1988 | Wiegel |
| 4,821,318 A | 4/1989 | Wu |
| D301,145 S | 5/1989 | Besasie et al. |
| 4,845,650 A | 7/1989 | Meade et al. |
| 4,875,233 A | 10/1989 | Derhaag |
| 4,907,266 A | 3/1990 | Chen |
| 4,952,024 A | 8/1990 | Gale |
| D313,092 S | 12/1990 | Nilsson |
| 5,003,589 A | 3/1991 | Chen |
| 5,018,599 A | 5/1991 | Dohi et al. |
| 5,023,824 A | 6/1991 | Chadima et al. |
| D318,670 S | 7/1991 | Taniguchi |
| 5,028,083 A | 7/1991 | Mischenko |
| 5,056,161 A | 10/1991 | Breen |
| D321,879 S | 11/1991 | Emmerling |
| 5,113,428 A | 5/1992 | Fitzgerald |
| D326,655 S | 6/1992 | Iribe |
| 5,155,659 A | 10/1992 | Kunert |
| 5,177,784 A | 1/1993 | Hu |
| 5,179,736 A | 1/1993 | Scanlon |
| D334,043 S | 3/1993 | Taniguchi et al. |
| 5,197,332 A | 3/1993 | Shennib |
| 5,202,197 A | 4/1993 | Ansell et al. |
| D337,116 S | 7/1993 | Hattori |
| 5,225,293 A | 7/1993 | Mitchell |
| 5,251,105 A | 10/1993 | Kobayashi |
| D341,567 S | 11/1993 | Acker |
| 5,267,181 A | 11/1993 | George |
| 5,281,957 A | 1/1994 | Schoolman |
| D344,494 S | 2/1994 | Cardenas |
| D344,522 S | 2/1994 | Taniguchi |
| 5,293,647 A | 3/1994 | Mirmilshteyn et al. |
| 5,305,244 A | 4/1994 | Newman |
| 5,369,857 A | 12/1994 | Sacherman et al. |
| 5,371,679 A | 12/1994 | Abe et al. |
| 5,381,473 A | 1/1995 | Andrea |
| 5,381,486 A | 1/1995 | Ludeke |
| 5,406,037 A | 4/1995 | Nageno |
| 5,438,626 A | 8/1995 | Neuman |
| 5,438,698 A | 8/1995 | Burton et al. |
| 5,446,788 A | 8/1995 | Lucey et al. |
| 5,469,505 A | 11/1995 | Gattey |
| D365,559 S | 12/1995 | Fathi |
| 5,475,791 A | 12/1995 | Schalk |
| 5,479,001 A | 12/1995 | Kumar |
| D367,256 S | 2/1996 | Tokunaga |
| 5,491,651 A | 2/1996 | Janik |
| 5,501,571 A | 3/1996 | Van Durrett et al. |
| 5,515,303 A | 5/1996 | Cargin et al. |
| 5,535,437 A | 7/1996 | Karl et al. |
| 5,553,312 A * | 9/1996 | Gattey et al. ................. 455/11.1 |
| 5,555,490 A | 9/1996 | Carroll |
| 5,555,554 A | 9/1996 | Hofer |
| 5,563,952 A | 10/1996 | Mercer |
| 5,572,401 A | 11/1996 | Carroll |
| 5,572,623 A | 11/1996 | Pastor |
| 5,579,400 A | 11/1996 | Ballein |
| D376,598 S | 12/1996 | Hayashi |
| D377,020 S | 12/1996 | Bungardt et al. |
| 5,581,492 A | 12/1996 | Janik |
| 5,604,050 A | 2/1997 | Brunette et al. |
| 5,604,813 A | 2/1997 | Evans et al. |
| 5,607,792 A | 3/1997 | Garcia et al. |
| D380,199 S | 6/1997 | Beruscha |
| 5,637,417 A | 6/1997 | Engmark |
| D384,072 S | 9/1997 | Ng |
| 5,665,485 A | 9/1997 | Kuwayama et al. |
| 5,671,037 A | 9/1997 | Ogasawara et al. |
| 5,673,325 A | 9/1997 | Andrea |
| 5,673,364 A | 9/1997 | Bialik |
| D385,272 S | 10/1997 | Jensen |
| 5,680,465 A | 10/1997 | Boyden |
| D385,855 S | 11/1997 | Ronzani |
| 5,687,244 A | 11/1997 | Untersander |
| D387,898 S | 12/1997 | Ronzani |
| D390,552 S | 2/1998 | Ronzani |
| D391,234 S | 2/1998 | Chacon et al. |
| 5,716,730 A | 2/1998 | Deguchi |
| 5,719,743 A | 2/1998 | Jenkins et al. |
| 5,719,744 A | 2/1998 | Jenkins et al. |
| D394,436 S | 5/1998 | Hall et al. |
| 5,749,072 A | 5/1998 | Mazurkiewicz et al. |
| 5,757,339 A | 5/1998 | Williams et al. |
| 5,762,512 A | 6/1998 | Trant et al. |
| 5,766,794 A | 6/1998 | Brunette et al. |
| 5,774,096 A | 6/1998 | Usuki et al. |
| 5,774,837 A | 6/1998 | Yeldener et al. |
| 5,778,026 A | 7/1998 | Zak |
| 5,781,644 A | 7/1998 | Chang |
| 5,787,166 A | 7/1998 | Ullman |
| 5,787,361 A | 7/1998 | Chen |
| 5,787,387 A | 7/1998 | Aguilar |
| 5,787,390 A | 7/1998 | Quinquis et al. |
| 5,793,865 A | 8/1998 | Leifer |
| 5,793,878 A | 8/1998 | Chang |
| D398,899 S | 9/1998 | Chaco |
| D400,848 S | 11/1998 | Clark et al. |
| 5,832,098 A | 11/1998 | Chen |
| 5,841,630 A | 11/1998 | Seto et al. |
| 5,841,859 A | 11/1998 | Chen |
| D402,651 S | 12/1998 | Depay et al. |
| 5,844,824 A | 12/1998 | Newman et al. |
| 5,856,038 A | 1/1999 | Mason |
| 5,857,148 A | 1/1999 | Weisshappel et al. |
| 5,860,204 A | 1/1999 | Krengel |
| 5,862,241 A | 1/1999 | Nelson |
| D406,098 S | 2/1999 | Walter et al. |
| 5,869,204 A | 2/1999 | Kottke et al. |
| 5,873,070 A | 2/1999 | Bunte et al. |
| 5,890,074 A | 3/1999 | Rydbeck |
| 5,890,108 A | 3/1999 | Yeldener |
| 5,895,729 A | 4/1999 | Phelps et al. |
| D409,137 S | 5/1999 | Sumita |
| 5,905,632 A | 5/1999 | Seto et al. |
| D410,466 S | 6/1999 | Mouri |
| D410,921 S | 6/1999 | Luchs et al. |
| D411,179 S | 6/1999 | Toyosato |
| 5,931,513 A | 8/1999 | Conti |
| 5,933,330 A | 8/1999 | Beutler et al. |
| 5,935,729 A | 8/1999 | Mareno |
| D413,582 S | 9/1999 | Tompkins |
| D414,470 S | 9/1999 | Chacon |
| 5,991,085 A | 11/1999 | Rallison et al. |
| 5,999,085 A | 12/1999 | Szwarc |
| 6,014,619 A | 1/2000 | Wuppermann et al. |
| 6,016,347 A | 1/2000 | Magnasco |
| 6,021,207 A | 2/2000 | Puthuff et al. |
| 6,036,100 A | 3/2000 | Asami |
| D422,962 S | 4/2000 | Shevlin et al. |

| | | |
|---|---|---|
| 6,051,334 A | 4/2000 | Tsurumaru |
| D424,035 S | 5/2000 | Steiner |
| 6,060,193 A | 5/2000 | Remes |
| 6,061,647 A | 5/2000 | Barrett |
| 6,071,640 A | 6/2000 | Robertson et al. |
| 6,075,857 A | 6/2000 | Doss et al. |
| 6,078,825 A | 6/2000 | Hahn et al. |
| 6,084,556 A | 7/2000 | Zwern |
| 6,085,428 A | 7/2000 | Casby et al. |
| 6,091,546 A | 7/2000 | Spitzer |
| D430,158 S | 8/2000 | Bhatia |
| D430,159 S | 8/2000 | Bhatia et al. |
| 6,101,260 A | 8/2000 | Jensen et al. |
| 6,114,625 A | 9/2000 | Hughes et al. |
| 6,120,932 A | 9/2000 | Slipy et al. |
| D431,562 S | 10/2000 | Bhatia et al. |
| 6,127,990 A | 10/2000 | Zwern |
| 6,136,467 A | 10/2000 | Phelps et al. |
| 6,137,868 A | 10/2000 | Leach |
| 6,137,879 A | 10/2000 | Papadopoulos et al. |
| 6,154,669 A | 11/2000 | Hunter et al. |
| D434,762 S | 12/2000 | Ikenaga |
| 6,157,533 A | 12/2000 | Sallam |
| 6,160,702 A | 12/2000 | Lee |
| 6,167,413 A | 12/2000 | Daley |
| D436,104 S | 1/2001 | Bhatia |
| 6,171,138 B1 | 1/2001 | Lefebvre et al. |
| 6,179,192 B1 | 1/2001 | Weinger et al. |
| 6,188,985 B1 | 2/2001 | Thrift |
| 6,190,795 B1 | 2/2001 | Daley |
| D440,966 S | 4/2001 | Ronzani |
| 6,225,777 B1 | 5/2001 | Garcia et al. |
| 6,226,622 B1 | 5/2001 | Dabbiere |
| 6,229,694 B1 | 5/2001 | Kono |
| 6,230,029 B1 * | 5/2001 | Hahn et al. ............... 455/575.2 |
| 6,235,420 B1 | 5/2001 | Ng |
| 6,237,051 B1 | 5/2001 | Collins |
| D443,870 S | 6/2001 | Carpenter et al. |
| 6,252,970 B1 | 6/2001 | Poon et al. |
| 6,261,715 B1 | 7/2001 | Nakamura et al. |
| D449,289 S | 10/2001 | Weikel et al. |
| 6,302,454 B1 | 10/2001 | Tsurumaru |
| 6,304,430 B1 | 10/2001 | Laine |
| 6,304,459 B1 | 10/2001 | Toyosato et al. |
| 6,310,888 B1 | 10/2001 | Hamlin |
| 6,324,053 B1 | 11/2001 | Kamijo |
| D451,903 S | 12/2001 | Amae et al. |
| D451,907 S | 12/2001 | Amae et al. |
| 6,325,507 B1 | 12/2001 | Jannard |
| 6,326,543 B1 | 12/2001 | Lamp |
| 6,327,152 B1 | 12/2001 | Saye |
| 6,339,706 B1 | 1/2002 | Tillgren et al. |
| 6,339,764 B1 | 1/2002 | Livesay et al. |
| 6,349,001 B1 | 2/2002 | Spitzer |
| 6,353,313 B1 | 3/2002 | Estep |
| 6,356,635 B1 | 3/2002 | Lyman et al. |
| 6,357,534 B1 | 3/2002 | Buetow et al. |
| 6,359,603 B1 | 3/2002 | Zwern |
| 6,359,777 B1 | 3/2002 | Newman |
| 6,359,995 B1 | 3/2002 | Ou |
| 6,364,126 B1 | 4/2002 | Enriquez |
| 6,369,952 B1 | 4/2002 | Rallison et al. |
| 6,371,535 B2 | 4/2002 | Wei |
| 6,373,942 B1 | 4/2002 | Braund |
| 6,374,126 B1 | 4/2002 | MacDonald, Jr. et al. |
| 6,376,942 B1 | 4/2002 | Burger |
| 6,377,825 B1 | 4/2002 | Kennedy et al. |
| D457,133 S | 5/2002 | Yoneyama |
| 6,384,591 B1 | 5/2002 | Estep |
| 6,384,982 B1 | 5/2002 | Spitzer |
| 6,386,107 B1 | 5/2002 | Rancourt |
| 6,394,278 B1 * | 5/2002 | Reed ............... 209/44.4 |
| 6,434,251 B1 | 8/2002 | Jensen et al. |
| 6,445,175 B1 | 9/2002 | Estep |
| 6,446,042 B1 | 9/2002 | Detlef |
| 6,453,020 B1 | 9/2002 | Hughes et al. |
| 6,456,721 B1 | 9/2002 | Fukuda |
| D463,784 S | 10/2002 | Taylor et al. |
| 6,466,681 B1 | 10/2002 | Siska, Jr. |
| D465,208 S | 11/2002 | Lee et al. |
| D465,209 S | 11/2002 | Rath |
| D466,497 S | 12/2002 | Wikel |
| 6,496,111 B1 | 12/2002 | Hosack |
| 6,500,581 B2 | 12/2002 | White et al. |
| D469,080 S | 1/2003 | Kohli |
| 6,511,770 B2 | 1/2003 | Chang |
| 6,532,148 B2 | 3/2003 | Jenks |
| 6,560,092 B2 | 5/2003 | Itou et al. |
| 6,562,950 B2 | 5/2003 | Peretz et al. |
| 6,581,782 B2 | 6/2003 | Reed |
| 6,600,798 B2 | 7/2003 | Wuppermann et al. |
| 6,615,174 B1 | 9/2003 | Arslan et al. |
| 6,628,509 B2 | 9/2003 | Kono |
| 6,633,839 B2 | 10/2003 | Kushner et al. |
| D482,019 S | 11/2003 | Petersen et al. |
| 6,658,130 B2 | 12/2003 | Huang |
| 6,660,427 B1 | 12/2003 | Hukill |
| D487,064 S | 2/2004 | Stekelenburg |
| 6,697,465 B1 | 2/2004 | Goss |
| D488,146 S | 4/2004 | Minto |
| D488,461 S | 4/2004 | Okada |
| 6,728,325 B1 | 4/2004 | Hwang et al. |
| 6,731,771 B2 | 5/2004 | Cottrell |
| D491,917 S | 6/2004 | Asai |
| D492,295 S | 6/2004 | Glatt |
| 6,743,535 B2 | 6/2004 | Yoneyama |
| 6,745,014 B1 | 6/2004 | Seibert |
| 6,749,960 B2 | 6/2004 | Takeshita |
| 6,754,361 B1 | 6/2004 | Hall |
| 6,754,632 B1 | 6/2004 | Kalinowski et al. |
| 6,757,651 B2 | 6/2004 | Vergin |
| D494,517 S | 8/2004 | Platto et al. |
| 6,769,762 B2 | 8/2004 | Saito et al. |
| 6,769,767 B2 | 8/2004 | Swab et al. |
| 6,772,114 B1 | 8/2004 | Sluijter et al. |
| 6,772,331 B1 | 8/2004 | Hind et al. |
| 6,778,676 B2 | 8/2004 | Groth et al. |
| 6,795,805 B1 | 9/2004 | Bessette et al. |
| D498,231 S | 11/2004 | Jacobson et al. |
| 6,811,088 B2 | 11/2004 | Lanzaro et al. |
| 6,826,532 B1 | 11/2004 | Casby et al. |
| 6,847,336 B1 | 1/2005 | Lemelson |
| 6,873,516 B1 | 3/2005 | Epstein |
| D506,065 S | 6/2005 | Sugino et al. |
| 6,909,546 B2 | 6/2005 | Hirai |
| D507,523 S | 7/2005 | Resch et al. |
| 6,934,567 B2 | 8/2005 | Gantz et al. |
| 6,934,675 B2 | 8/2005 | Glinski |
| 6,965,681 B2 | 11/2005 | Almqvist |
| D512,417 S | 12/2005 | Hirakawa et al. |
| D512,984 S | 12/2005 | Ham |
| D512,985 S | 12/2005 | Travers et al. |
| 7,013,018 B2 | 3/2006 | Bogeskov-Jensen |
| D519,497 S | 4/2006 | Komiyama |
| 7,027,774 B2 * | 4/2006 | Kuon ............... 455/41.2 |
| D521,492 S | 5/2006 | Ham |
| 7,050,598 B1 | 5/2006 | Ham |
| 7,052,799 B2 | 5/2006 | Zatezalo et al. |
| 7,063,263 B2 | 6/2006 | Swartz et al. |
| D524,794 S | 7/2006 | Kim |
| D525,237 S | 7/2006 | Viduya |
| 7,082,393 B2 | 7/2006 | Lahr |
| 7,085,543 B2 | 8/2006 | Nassimi |
| 7,099,464 B2 | 8/2006 | Lucey et al. |
| 7,106,877 B1 | 9/2006 | Linville |
| 7,107,057 B2 | 9/2006 | Arazi et al. |
| 7,110,800 B2 | 9/2006 | Nagayasu et al. |
| 7,110,801 B2 | 9/2006 | Nassimi |
| D529,447 S | 10/2006 | Greenfield |
| D531,586 S | 11/2006 | Poulet |
| 7,136,684 B2 | 11/2006 | Matsuura et al. |
| 7,143,041 B2 | 11/2006 | Sacks et al. |
| D537,438 S | 2/2007 | Hermansen |
| 7,185,197 B2 | 2/2007 | Wrench, Jr. |

| | | | |
|---|---|---|---|
| 7,203,651 | B2 | 4/2007 | Baruch et al. |
| 7,225,130 | B2 | 5/2007 | Roth et al. |
| D549,216 | S | 8/2007 | Viduya |
| D549,217 | S | 8/2007 | Viduya |
| D549,694 | S | 8/2007 | Viduya et al. |
| D551,615 | S | 9/2007 | Wahl |
| D552,595 | S | 10/2007 | Viduya et al. |
| 7,343,177 | B2 | 3/2008 | Seshadri et al. |
| 7,343,283 | B2 | 3/2008 | Ashley |
| 7,346,175 | B2 | 3/2008 | Hui et al. |
| D567,218 | S | 4/2008 | Viduya et al. |
| D567,219 | S | 4/2008 | Viduya et al. |
| D567,799 | S | 4/2008 | Viduya et al. |
| D567,806 | S | 4/2008 | Viduya et al. |
| 7,369,991 | B2 | 5/2008 | Manabe et al. |
| 7,391,863 | B2 | 6/2008 | Viduya |
| 7,519,186 | B2 | 4/2009 | Varma et al. |
| 7,519,196 | B2 | 4/2009 | Bech |
| 7,596,489 | B2 | 9/2009 | Kovesi et al. |
| 7,885,419 | B2 | 2/2011 | Wahl et al. |
| 8,050,657 | B2 | 11/2011 | Hollander |
| 2001/0010689 | A1* | 8/2001 | Awater et al. ............. 370/344 |
| 2001/0017925 | A1 | 8/2001 | Ceravolo |
| 2001/0017926 | A1 | 8/2001 | Vicamini |
| 2001/0036291 | A1 | 11/2001 | Pallai |
| 2001/0046305 | A1 | 11/2001 | Muranami |
| 2002/0003889 | A1 | 1/2002 | Fischer |
| 2002/0015008 | A1 | 2/2002 | Kishida |
| 2002/0067825 | A1 | 6/2002 | Baranowski |
| 2002/0068610 | A1 | 6/2002 | Anvekar |
| 2002/0076060 | A1 | 6/2002 | Hall |
| 2002/0110246 | A1 | 8/2002 | Gosior |
| 2002/0111197 | A1 | 8/2002 | Fitzgerald |
| 2002/0131616 | A1 | 9/2002 | Bronnikov |
| 2002/0141547 | A1 | 10/2002 | Odinak et al. |
| 2002/0152065 | A1 | 10/2002 | Kopp |
| 2003/0095525 | A1 | 5/2003 | Lavin |
| 2003/0118197 | A1* | 6/2003 | Nagayasu et al. ............. 381/74 |
| 2003/0130852 | A1 | 7/2003 | Tanaka et al. |
| 2003/0179888 | A1 | 9/2003 | Burnett |
| 2003/0228023 | A1 | 12/2003 | Burnett |
| 2004/0024586 | A1 | 2/2004 | Andersen |
| 2004/0063475 | A1 | 4/2004 | Weng |
| 2004/0091129 | A1 | 5/2004 | Jensen |
| 2005/0070337 | A1 | 3/2005 | Byford et al. |
| 2005/0149414 | A1 | 7/2005 | Schrodt |
| 2005/0232436 | A1 | 10/2005 | Nagayasu et al. |
| 2005/0272401 | A1 | 12/2005 | Zatezalo |
| 2007/0223766 | A1 | 9/2007 | Davis |
| 2010/0296683 | A1 | 11/2010 | Slippy et al. |
| 2011/0107415 | A1 | 5/2011 | Shen |
| 2011/0116672 | A1 | 5/2011 | Wahl et al. |
| 2012/0045082 | A1 | 2/2012 | Wahl et al. |

FOREIGN PATENT DOCUMENTS

| | | |
|---|---|---|
| EP | 0380290 | 8/1990 |
| EP | 0531645 A2 | 3/1993 |
| EP | 0703720 A1 | 3/1996 |
| EP | 1018854 | 7/2000 |
| EP | 01383029 A2 | 1/2004 |
| EP | 2320629 A2 | 5/2011 |
| EP | 2352271 A2 | 8/2011 |
| GB | 2275846 A | 9/1994 |
| WO | 2006019340 A1 | 2/2006 |
| WO | 2007061648 A2 | 5/2007 |
| WO | 2007075226 A1 | 7/2007 |
| WO | 2008089444 A2 | 7/2008 |
| WO | 2010135314 A1 | 11/2010 |
| WO | 2011056914 A1 | 5/2011 |
| WO | 2012023993 A1 | 2/2012 |

OTHER PUBLICATIONS

Published U.S. Patent Publication No. 2002/0016161; published Feb. 7, 2002, filing date Jan. 29, 2001; Dellien et al., *Method and apparatus for compression of speech encoded parameters*.

Published U.S. Patent Publication No. 2002/0091526; published Jul. 11, 2002, filing date Dec. 13, 2001; Kiessling et al., *Mobile terminal controllable by spoken utterances*.

Published U.S. Patent Publication No. 2002/0159574; published Oct. 31, 2002, filing date Apr. 27, 2001; Stogel, *Automatic telephone directory apparatus and method of operation thereof*.

Published U.S. Patent Publication No. 2003/0050786; published Mar. 13, 2003, filing date Aug. 7, 2001; Jax et al., *Method and apparatus for synthetic widening of the bandwidth of voice signals*.

Published U.S. Patent Publication No. 2003/0103413; published Jun. 5, 2003, filing date Nov. 30, 2001; Jacobi, Jr. et al., *Portable universal interface device*.

Published U.S. Patent Publication No. 2003/0182243; published Sep. 25, 2003, filing date Mar. 20, 2002; Gerson et al., *Method and apparatus for remote control of electronically activated tasks*.

Published U.S. Patent Publication No. 2003/0212480; published Nov. 13, 2003, filing date May 10, 2002; Lutter et al., *Method and apparatus for controlling operations in a vehicle*.

Published U.S. Patent Publication No. 2003/0217367; published Nov. 20, 2003, filing date May 20, 2002; Romano, *Wireless hand-held video, data, and audio transmission system*.

Published U.S. Patent Publication No. 2004/0001588; published Jan. 1, 2004, filing date Jun. 28, 2002; Hairston, *Headset cellular telephones*.

Published U.S. Patent Publication No. 2004/0010407; published Jan. 15, 2004, filing date Sep. 5, 2001; Kovesi et al., *Transmission error concealment in an audio signal*.

Published U.S. Patent Publication No. 2004/0029610; published Feb. 12, 2004, filing date May 2, 2003; Ihira et al., *Portable radio communication terminal and call center apparatus*.

Published U.S. Patent Publication No. 2004/0046637; published Mar. 11, 2004, filing date May 18, 2001; Wesby Van Swaay, *Programmable communicator*.

Published U.S. Patent Publication No. 2004/0049388; published Mar. 11, 2004, filing date Sep. 6, 2002; Roth et al., *Methods, systems, and programming for performing speech recognition*.

Published U.S. Patent Publication No. 2004/0083095; published Apr. 29, 2004, filing date Oct. 23, 2002; Ashley et al., *Method and apparatus for coding a noise-suppressed audio signal*.

International Search Report, mailed Aug. 11, 2004.

Hong Kook Kim, et al.; A Bitstream-Based Front-End for Wireless Speech Recognition on IS-136 Communications System; IEEE Transactions on Speech and Audio Processing; Manuscript received Feb. 16, 2000, revised Jan. 25, 2001; 11 Pages; vol. 9; No. 5; Jul. 2001; New York, NY, US.

Mladen Russo, et al; Speech Recognition over Bluetooth ACL and SCO Links: A Comparison; Consumer Communications and Networking Conference 2005; Jan. 3-6, 2005; 5 Pages; Las Vegas, NV, US.

Four-page Vocollect Speech Recognition Headsets brochure—Clarity and comfort. Reliable performance. Copyright Sep. 2005.

Four-page Vocollect Speech Recognition Headsets brochure—SR 30 Series Talkman High-Noise Headset. Copyright 2005.

Two-page Vocollect SR 20 Talkman Lightweight Headset Product Information Sheet. Copyright Aug. 2004.

Photographs 1-7 SR Talkman Headset Aug. 2004—Prior art.

Two-page Supplemental Vocollect SR 20, Talkman Lightweight Headset Product Information Sheet. Copyright Aug. 2004.

Photographs 1-8 SR Talkman Headset.

* cited by examiner

| BLUETOOTH LINK TYPE | BLUETOOTH PACKET TYPE | PAYLOAD SIZE (BITS) | RETRANSMISSTIONS SUPPORTED | FOREWARD ERROR CORRECTION | SYMMETRIC MAX RATE (KBPS) | ASYMMETRIC MAX RATE (KBPS) | |
|---|---|---|---|---|---|---|---|
| ACL | DM1 | 0-136 | YES | YES | 108.8 | 108.8 | 108.8 |
| ACL | DM3 | 0-968 | YES | YES | 258.1 | 387.2 | 54.4 |
| ACL | DM5 | 0-1792 | YES | YES | 286.7 | 477.8 | 36.3 |
| ACL | DH1 | 0-216 | YES | NO | 172.8 | 172.8 | 172.8 |
| ACL | DH3 | 0-1464 | YES | NO | 390.4 | 585.6 | 86.4 |
| ACL | DH5 | 0-2712 | YES | NO | 433.9 | 723.2 | 57.6 |
| | | | | | | | |
| SCO | HV1 | 80 | NO | YES | 64.0 | N/A | N/A |
| SCO | HV3 | 160 | NO | YES | 64.0 | N/A | N/A |
| SCO | HV5 | 240 | NO | NO | 64.0 | N/A | N/A |

1

WIRELESS HEADSET AND METHOD FOR ROBUST VOICE DATA COMMUNICATION

FIELD OF THE INVENTION

This invention relates generally to wireless communication devices, and particularly to a wireless device, such as a headset, utilized for speech recognition applications, and other speech applications.

BACKGROUND OF THE INVENTION

Wireless communication devices are used for a variety of different functions and to provide a communication platform for a user. One particular wireless communication device is a headset. Generally, headsets incorporate speakers that convey audio signals to the wearer, for the wearer to hear, and also incorporate microphones to capture speech from the wearer. Such audio and speech signals are generally converted to electrical signals and processed to be wirelessly transmitted or received.

Wireless headsets have become somewhat commonplace. Wireless headsets are generally wirelessly coupled with other devices such as cell phones, computers, stereos, and other devices that process audio signals. In use, a wireless headset may be coupled with other equipment utilizing various RF communication protocols, such as the IEEE 802.11 standard for wireless communication. Other wireless communication protocols have been more recently developed, such as the Bluetooth protocol.

Bluetooth is a low-cost, low-power, short-range radio technology designed specifically as a cable replacement to connect devices, such as headsets, mobile phone handsets, and computers or other terminal equipment together. One particular use of the Bluetooth protocol is to provide a communication protocol between a mobile phone handset and an earpiece or headpiece. The Bluetooth protocol is a well; known protocol understood by a person of ordinary skill in the art, and thus all of the particulars are not set forth herein.

While wireless headsets are utilized for wireless telephone communications, their use is also desirable for other voice or audio applications. For example, wireless headsets may play a particular role in speech recognition technology. U.S. patent application Ser. No. 10/671,140, entitled "Wireless Headset for Use in a Speech Recognition Environment," and filed on Sep. 25, 2003, sets forth one possible use for a wireless headset and that application is incorporated herein by reference in its entirety. Speech recognition applications demand high quality speech or audio signal, and thus a significantly robust communication protocol. While Bluetooth provides an effective means for transmission of voice for typical telephony applications, the current Bluetooth standard has limitations that make it significantly less effective for speech recognition applications and systems.

For example, the most frequently used standard representing voice or speech data in the telephony industry utilizes 8-bit data digitized at an 8,000 Hz sample rate. This communication standard has generally evolved from the early days of analog telephony when it was generally accepted that a frequency range of 250 Hz to 4,000 Hz was adequate for voice communication over a telephone. More recent digital voice protocol standards, including the Bluetooth protocol, have built upon this legacy. In order to achieve an upper bandwidth limit of 4,000 Hz, a minimal sample rate of at least twice that, or 8,000 Hz, is required. To minimize link bandwidth, voice samples are encoded as 8 bits per sample and employ a non-linear transfer function to provide increased dynamic range on the order of 64-72 dB. The Bluetooth standard supports generally the most common telephony encoding schemes. At the physical layer, the Bluetooth protocol uses a "synchronous connection oriented" (SCO) link to transfer voice data. An SCO link sends data at fixed, periodic intervals. The data rate of an SCO link is fixed at 64,000 bits per second (64 Kbps). Voice packets transmitted over an SCO link do not employ flow control and are not retransmitted. Therefore, some packets are dropped during normal operation, thus resulting in data loss of portions of the audio signals.

For most human-to-human communication applications, such as telephony applications, the current Bluetooth voice sampling and encoding techniques using SCO links and voice packets are adequate. Generally, humans have the ability to subconsciously use reasoning, context, and other clues to mentally reconstruct the original speech over a more lossy communication medium. Furthermore, where necessary, additional mechanisms, such as the phonetic alphabet, can be employed to ensure the reliability of the information transferred (e.g., "Z" as in Zulu).

However, for human-to-machine communication, such as speech recognition systems, significantly better speech sampling and encoding performance is necessary. First, a more reliable data link is necessary, because dropped voice packets in the typical telephony Bluetooth protocol can significantly reduce the performance of a speech recognition system. For example, each dropped Bluetooth SCO packet can result in a loss of 3.75 milliseconds of speech. This can drastically increase the probability of a speech recognition error.

Additionally, the information-bearing frequency range of speech is now understood to be in the range of 250 Hz to 6,000 Hz, with additional less critical content available up to 10,000 Hz. The intelligibility of consonants has been shown to diminish when the higher frequencies are filtered out of the speech signal. Therefore, it is important to preserve this high end of the spectrum.

However, increasing the sample rate of the audio signal to 12,000 Hz, while still maintaining 8-bit encoding exceeds the capability of the Bluetooth SCO link, because such an encoding scheme would require a data rate of 96 Kbps, which is above the 64 Kbps Bluetooth SCO rate.

Speech samples digitized as 8-bit data also contain a high degree of quantization error, which has the effect of reducing the signal-to-signal ratio (SNR) of the data fed to the recognition system. Speech signals also exhibit a variable dynamic range across different phonemes and different frequencies. In the frequency ranges where dynamic range is decreased, the effect of quantization error is proportionally increased. A speech system with 8-bit resolution can have up to 20 dB additional quantization error in certain frequency ranges for the "unvoiced" components of the speech signal. Most speech systems reduce the effect of quantization error by increasing the sample size to a minimum of 12 bits per sample. Thus, the current Bluetooth voice protocol for telephony is not adequate for speech application such as speech recognition applications.

Therefore, there is a need for an improved wireless device for use in speech and voice applications. There is particularly a need for a wireless headset device that is suitable for use in speech recognition applications and systems. Still further, it would be desirable to incorporate a Bluetooth protocol in a wireless headset suitable for use with speech recognition systems.

BRIEF DESCRIPTION OF THE DRAWINGS

The accompanying drawings, which are incorporated in and constitute a part of this specification, illustrate embodiments of the invention and, together with a general description of the invention given above, and the detailed description of the embodiments given below, serve to explain the principles of the invention.

DETAILED DESCRIPTION OF EMBODIMENT OF THE INVENTION

The present invention addresses the above-referenced issues and noted drawbacks in the prior art by providing a wireless device that is useful for speech applications and, particularly, useful for speech recognition applications that require higher quality speech signals for proper performance. To that end, the present invention rather than relying upon voice sampling and coding techniques for human-to-human communication, such as over the telephone, utilizes correlation processing and represents spectral characteristics of an audio or speech signal in the form of data.

Particularly, an autocorrelation component of the invention generates a set of coefficients for successive portion or frames of a digitized audio signal. The coefficients are reflective of spectral characteristics of the audio signal portions, which are represented by multiple successive frames. The sets of coefficients reflective of audio signal frames are transmitted as data packets in a wireless format. Although various wireless transmission protocols might be used, one particular embodiment utilizes a Bluetooth transceiver and a Bluetooth protocol. However, rather than utilizing standard Bluetooth voice processing and voice packets, the present invention transmits the sets of coefficients as data, utilizing data packets in the Bluetooth protocol. Other wireless transmission schemes may utilize their data transmission parameters, as well, in accordance with the principles of the present invention, as opposed to voice parameters, which are general utilized to transmit voice for human-to-human communication. In one particular aspect, the Bluetooth transceiver utilizes an asynchronous connection-less (ACL) link for transmitting the coefficients as data.

Therefore, the present invention overcomes the inherent limitations of Bluetooth and other wireless communication methods for use with speech recognition, by providing desired link reliability between the devices, providing high dynamic range and lower quantization error coding, and by providing less link bandwidth than current methods, while avoiding additional computational complexity on the speech recognition system.

Figure 1:
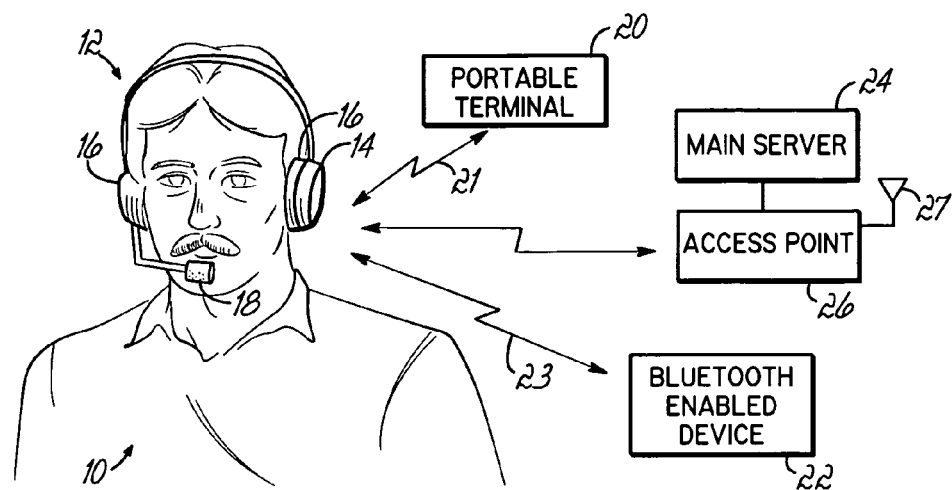
FIG. 1 illustrates the schematic view of a communication system in which the present invention may be incorporated.

FIG. 1 illustrates a schematic view of a system incorporating the invention and aspects thereof. The aspects and features of the present invention may be incorporated into various different wireless devices, which contain the signal processing capability and wireless transceiving capability for implementing the elements of the invention. For example, the invention might be incorporated into a traditional computer, such as a desktop or laptop computer, in a portable terminal or portable computing device, a cellular phone, a headset, or any other device which is operable for processing audio signals and transceiving the data which results from such signal processing according to the invention.

In one particular embodiment of the invention, it is incorporated into a wireless headset device worn by a user, and the data is transceived as data packets utilizing a Bluetooth protocol. Therefore, in the example discussed herein, a Bluetooth-enabled headset device is described. However, it should be understood that this is only one particular device and one particular data-transceiving protocol that might be utilized. Other such devices and transceiving protocols could also be used in accordance with aspect of the present invention. Therefore, the invention is not limited only to Bluetooth headsets.

Referring again to FIG. 1, a user 10 is shown utilizing or wearing a headset device 12. The headset 12 has wireless transceiving capabilities, which are implemented by appropriate processing and transceiving circuitry 14. The headset circuitry 14 also handles other signal processing as described below. The headset 12 will generally usually have one or more speakers 16 for the user to hear audio signals that are received as well as to hear those audio signals that are spoken and transmitted by the user. To capture audio signals, such as speech, the headset 12 incorporates a microphone 18. The processed signals are referred to herein generally as "audio signals" and will include voice and speech signals, as well as other audio signals. Generally, it is desirable for the user to communicate commands, responses, general speech, etc. to one or more devices, which are wirelessly coupled to the headset. For example, the headset 12 might communicate with a portable terminal 20 which may be worn or carried by the user, another person, or a piece of equipment. Such a wireless link is indicated by reference numeral 21. Similarly, the wireless headset 12 might communicate with another enabled device, such as a cellular phone or other device 22, which is coupled by wireless link 23. In FIG. 1 device 22 is indicated as being a Bluetooth-enabled device, although other transceiving protocols might be used. In another embodiment, headset 12 may be coupled directly to a server or other computer device 24, generally through a wireless access point 26, which has an appropriate antenna 27. The wireless link to the server 24 is indicated by reference 25. Generally, the wireless coupling of a device such as headset 12 to various other devices (not shown) in accordance with the principles of the present invention is also possible, as long as the devices have the necessary processing and transceiving circuitry for implementing the invention.

One particular speech application for the wireless headset device 12 or other inventive wireless device is a speech recognition application wherein the speech generated by user 10 is analyzed and processed for performing multiple tasks. For example, a user might be directed to perform a task through headset 12. Upon or during completion of the task, the user might speak to the system, through microphone 18, to confirm the instructions and task, ask additional information, or report certain conditions, for example. The speech of the user and the words spoken must then be analyzed or "recognized" to extract the information therefrom. U.S. patent application Ser. No. 10/185,995, entitled "Terminal and Method for Efficient Use and Identification of Peripherals" and filed on Jun. 27, 2002, discusses use of a headset and speech recognition in an inventory management system, for example, that application is incorporated herein by reference in its entirety. Various different speech recognition technologies may be used to process the unique data generated by the wireless headset or other device of the invention, and persons of ordinary skill in the art know such technologies. Therefore, the particulars of a specific speech recognition system are not set forth herein.

Figure 2:
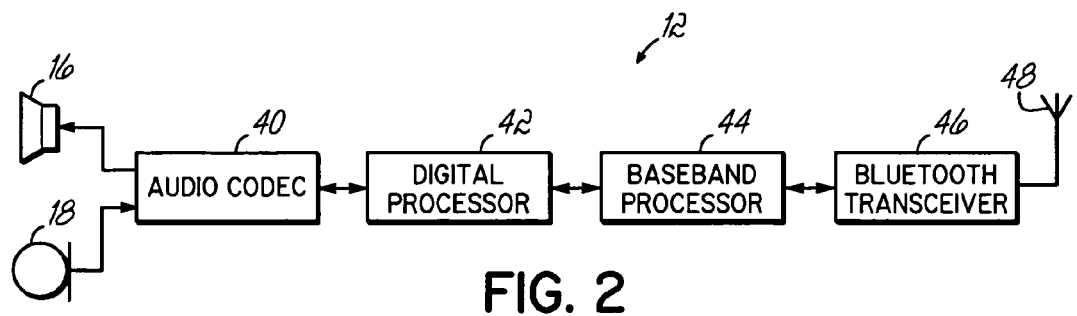
FIG. 2 illustrates a block diagram view of components of a wireless communication device in accordance with the principles of the invention.

FIG. 2 illustrates, in block diagram form, various components of a wireless headset 12 to implement one embodiment of the invention. The components illustrated, while separated into functional blocks in FIG. 2, might be combined together into a single integrated circuit, or maybe implemented utilizing individual circuit components. As noted above, headset 12 incorporates a microphone 18 for capturing an audio signal, such as a speech signal from user 10. Microphone 18 is coupled to an audio coder/decoder or audio codec 40. The audio codec 40 performs analog-to-digital (A/D) conversion on the analog audio signal captured by microphone 18. The audio codec 40 also preferably performs anti-aliasing on the resulting digitized data as well. In effect, audio codec 40 provides a digitized audio signal reflective of the analog audio signal captured by microphone 18. Audio codec 40 supports the necessary data sample rates and bit resolutions noted below for implementing various embodiments of the present invention. Particularly, audio codec 40 provides sampling rates for high-quality audio signals that capture most of the speech frequencies that would be of interest to speech applications, such as speech recognition applications.

The digital audio data, or the digitized audio signal, is supplied to a digital processor 42. The digital processor includes a microprocessor or other digital signal processor, volatile and non-volatile memory, and associated logic necessary to provide the desired processing of the signal for implementing the invention. For example, as discussed further below, the digital processor 42 may provide pre-emphasis processing, frame generation, windowing, and auto correlation processing of the digital data stream. The product of the digital processor 42 is processed, digitized audio or speech data, which is then supplied to a baseband processor 44, such as a Bluetooth baseband processor, for example.

The baseband processor 44 then formats the processed digital speech data according to transceiving protocol standards and, in the exemplary embodiment, according to Bluetooth protocol standards. However, the digital speech data provided by baseband processor 44 is not transmitted as voice packets under the Bluetooth protocol, as it would be under typical Bluetooth telephony applications. Rather, in accordance with one aspect of the invention, the digitized speech is transmitted as data using data packets under the Bluetooth protocol. The baseband processor may perform such operations as adding packet header information, forward error correction, cyclic redundancy check, and data encryption. It also implements and manages the Bluetooth stack. As noted above, the Bluetooth transmission protocol is a standard transmission protocol, and thus will be readily understood by a person of ordinary skill in the art. As such, all of the various specifics associated with Bluetooth transmission are not discussed herein.

A wireless transceiver, such as a Bluetooth transceiver 46, coupled to an antenna 48, performs all operations necessary to transmit and receive the voice data over a wireless link, such as a Bluetooth link. Wireless transceiver 46 might be operable under another wireless communication protocol even though the exemplary embodiment discussed herein utilizes Bluetooth. The operations of Bluetooth transceiver 46 may include, but are not limited to, such typical transceiver operations as conversion to RF frequencies, modulation and demodulation, spreading, and amplification. Antenna 48 provides efficient transmission and reception of signals in a wireless format.

While one aspect of the invention is directed to transmitting a representation of captured speech signals from a device for use in speech recognition applications, wireless headset 12 also implements a receive data link. All the various functional blocks shown in FIG. 2 support bidirectional data transfer. The audio codec 40 is capable of performing digital-to-analog (D/A) conversion and sending the analog signal to one or more speakers 16. The audio codec 40 preferably separates A\D and D\A converters with independent channels so that full duplex operation is possible. The received data link can be implemented utilizing either an asynchronous connectionless (ACL) link, as discussed further below for one embodiment of the invention, or an SCO link. If telephony-quality data is acceptable on the receive link, then an SCO link can be employed, and standard Bluetooth audio processing can be performed by either the baseband processor 44 or the digital processor 42, or by some combination of both. The processed audio data will then be sent to the audio codec 40 for playback by speakers 16. Generally, an SCO link using various packets might be acceptable on the receive side, unlike the transmit side of the invention, because the received data link may contain audio that will be listened to and interpreted by a human (i.e. the user) rather than a machine. As with typical Bluetooth voice applications, a lower quality voice link is possible for telephony applications.

However, if a more reliable link is necessary or desired, then an ACL link might be employed on the receive side as well, according to the invention. In that case, audio processing would be performed by the digital processor 42. A more reliable receive data link may be necessary, for example, for safety-critical applications, such as for use by emergency first responders.

As noted above, it will be apparent to a person of ordinary skill in the art that the disclosed embodiment is exemplary only and a wide range of other embodiments may be implemented in accordance with the principles of the present invention. For example, various different commercially available components are available to implement the elements described in FIG. 2, with varying levels of integration. Furthermore, the functional blocks in the Figure may be implemented using individual integrated circuit components, or several functional blocks may be combined together into a single integrated circuit.

Figures 3, 4:
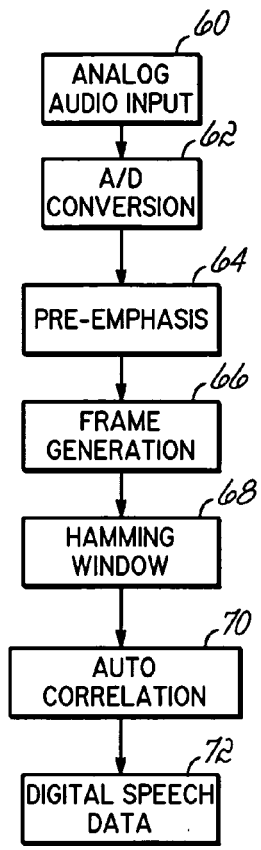
FIG. 3 is a flow chart illustrating one operational embodiment of the present invention.
FIG. 4 is a table of Bluetooth protocol parameters utilized in accordance with one aspect of the present invention.

Referring now to FIG. 3, that figure shows a processing flow chart for one embodiment of the present invention. Analog audio signals, such as user speech or voice signal, are collected, such as by a microphone 18 in the headset 12 in the example discussed herein. Alternatively, an analog audio signal might be retrieved from a storage medium, such as tape to be further processed and transmitted according to the invention. The audio input is provided to circuitry for performing A/D conversion 62. For example, the audio signals might be directed to a codec 40 as discussed. In the A/D conversion step 62, the analog audio signal is converted to digital samples, which are suitable for being further processed and for being used in speech applications, such as in a speech recognition system. The A/D conversion step 62 may utilize typical sampling rates for high-quality audio signals, such as sampling rates 11,025 Hz; 16,000 Hz; 22,060 Hz; 44,100 Hz, and 48,000 Hz. For the purposes of discussion of the exemplary embodiment herein, we will address the sample rates of 11,025 Hz and 16,000 Hz. Such sample rates are suitable for capturing most of the speech frequencies that would be of interest in general speech applications, such as a speech recognition application. Accordingly, the audio codec 40 is configured and operable for achieving such sampling rates. It is also desirable that the resolution of the A/D conversion in step 62 by the codec 40 is at least 12 bits in order to provide an acceptable quantization error. Reasonably priced devices that provide up to 16 bits of resolution are commercially available and, thus, a 16-bit resolution is also discussed in the exemplary environment herein. Of course, other higher resolutions might also be utilized.

The output of the A/D conversion step 62 may, therefore, provide a continuous bit stream of from 132.3 Kilobits/second (Kbps) (i.e., 11,025 Hz×12 bits resolution) to around 256 Kbps (i.e., 16,000 Hz×16 bits resolution). While such a bit stream would clearly exceed the capability of a typical Bluetooth SCO link using voice packets to transmit the speech signal, the present invention provides generation of data reflective of the audio signal and, utilizes an ACL link with data packets. Additional processing of the bit stream enhances the data for being transmitted, and then subsequently used with a speech application, such as speech recognition system, the additional processing also reduces the bandwidth needed to transfer the data over a Bluetooth link.

Specifically, to further process the bit stream, a pre-emphasis step 64 may be utilized. A pre-emphasis step may be performed, for example, by the digital processor 42. In one embodiment, the pre-emphasis is typically provided in the digital processor by a first-order filter that is used to emphasize the higher frequencies of the speech spectra, which may contain information of greater value to a speech recognition system than the lower frequencies. One suitable filter may have an equation of the form:

$$y(t) = x(t) - a*y(t-1) \qquad \text{EQ 1}$$

where "a" is a scaling factor that is utilized to control the amount of pre-emphasis applied. The range of the scaling factor is typically between 0.9 and 1.0 depending upon the amount of spectral tilt present in the speech data. Spectral tilt essentially refers to the overall slope of the spectrum of a speech signal as is known to those of skill in the art.

To further process the digitized audio signal in the form of the bit stream, the data stream is then processed through a frame generation step or steps 66. The frame generation might also be performed by digital signal processing circuitry such as the digital processor 42 of FIG. 2. In the frame generation step, the data stream is subdivided into multiple successive frames to be further processed. In one embodiment of the invention, the frames are overlapping frames. Data overlap on each end of the frame is needed to eliminate artifacts that would be introduced by the signal-processing algorithms further down the processing chain. For speech recognition systems, framed buffer sizes may typically range from 10 msec (i.e., 100 frames per second) to 100 msec (i.e., 10 frame per second) of continuous audio samples. Frames may have an overlap of around 0 percent to 50 percent of the previous frame. The frames essentially represent portions of the digitized audio signal and the successive frames thus make up the whole captured audio signal from step 60. Follow-unprocessing is then performed on each frame sequentially.

Referring again to FIG. 3, a windowing step may be provided in the digital signal processing by digital processor 42. For example, a Hamming window might be utilized to multiply each frame in one embodiment. Of course, other types of windowing circuits might also be utilized to adjust the digitized audio signal. The windowing step 68, such as with a Hamming window, serves to smooth the frequency content of the frame and reduce spectral leakage that would occur by the implicit rectangular windowing imposed by the framing operation of step 66. Without the windowing step 68 of the Hamming window, the sudden breaks at each end of the successive frames would cause ringing in the frequency content, spreading energy from some frequencies across the entire spectrum. The Hamming window tapers the signal at the edges of the frame, thereby reducing the spectral leakage that occurs. The Hamming window has a raised cosine shape and might be specified for a window of size "N," as follows:

$$w(i) = 0.54 + 0.46 * \cos\left(\frac{2\pi * i}{N} - \pi\right) \qquad \text{EQ 2}$$

In accordance with a further aspect of the present invention, an autocorrelation step 70 is performed. That is, the autocorrelation of each frame is calculated in sequence. The autocorrelation step 70 generates a set of coefficients for each frame. The coefficients are reflective of spectral characteristics of the audio signal portion represented by the frame. That is, the data sent by the present invention is not simply a digitized voice signal, but rather is a set of coefficients configured as data that are reflective of spectral characteristics of the audio signal portion.

In a speech signal, it is the envelope of the spectrum that contains the data of interest to a speech recognition system. The autocorrelation step 70 computes a set of coefficients that parameterize the spectral envelope of the speech signal. That is, the coefficient set is reflective of the spectral envelope. This is a particular advantage of the present invention, with use in speech recognition systems, because speech recognition systems also use autocorrelation coefficients. Therefore, in further processing, the data sent by the inventive wireless device, no additional computational complexity would be imposed on the speech recognition system.

Autocorrelation is computed on each frame as follows, for example:

$$R(i) = \sum_{t} x(t) * x(t-i) \qquad \text{EQ 3}$$

where "R" is autocorrelation coefficients,
where "i" is in the range of 0 to the number of autocorrelation coefficients generated minus 1, and
where "t" is based on the size of the frame.

Autocorrelation algorithms are known to a person of ordinary skill in the art to generate spectral information useful to a speech recognition system. The number of coefficients to use depends primarily on the speech frequency range and the spectral tilt of the speech signal. As a general rule, two coefficients are generated for every 1,000 Hz of speech bandwidth, plus additional coefficients as needed for the speech recognition system to compensate for spectral tilt. In accordance with one aspect of the present invention, the typical values of "i" as the number of coefficients, range from 10 to 21 coefficients per frame. Each coefficient that is generated in the invention is represented as a data word, and the data word sizes typically range from 16 to 32 bits for each coefficient. Of course, different ranges of coefficients might be utilized, as well as different sized data words. However, the noted ranges are typical for an exemplary embodiment of the invention. The autocorrelation step is also a process provided by the digital signal processor, or digital processor 42.

The resulting output from the autocorrelation step 70 is digital speech data 72 that consists of a set of autocorrelation coefficients reflective of the spectral characteristics of the captured analog audio input. Therefore, the coefficients can be used to recreate the original voice waveform, although with some loss compared with the original waveform, due to the digitization of the signal processing, as noted above.

In accordance with another aspect of the present invention, a wireless transceiver is configured for transmitting the set of coefficients as data. In an example utilizing a Bluetooth transceiver, the set of coefficients may be transmitted as data utilizing data packets in the Bluetooth protocol, and utilizing a Bluetooth ACL link. The transceiver is configured for transmitting the set of coefficients as data to another device to utilize for speech applications, such as speech recognition applications. The speech recognition system utilizes the autocorrelation data to compute speech features general referred to as "cepstra," as is known in the art of speech recognition. The cepstra is then used with a pattern-matching approach to identify the spoken word, also in line with recognized speech recognition technology. Therefore, since speech recognition systems already use the autocorrelation coefficients that are sent as data by the present invention, no additional computational complexity is imposed on the speech recognition system, as noted above. The speech recognition system may exist elsewhere in the processing stream, such as in main server 24, portable terminal 20, or in another Bluetooth-enabled device 22.

Providing a speech signal as a coefficient data over a Bluetooth or other transceiving protocol rather than as traditional digitized voice provides significant benefits noted above. Reviewing the bit rates achieved by the invention, which are provided as digital speech data, the bit rate using the processing chain can range, for example, from around 1.6 Kbps to 67.2 Kbps depending on the parameters chosen for implementing the embodiment of the invention. For example, $$\text{Minimum rate}=10 \text{ frames/second}*10 \text{ words/frame}*16 \text{ bits/word}=1,600 \text{ bits/second}(1.6 \text{ Kbps}) \quad \text{EQ4}$$

$$\text{Maximum rate}=100 \text{ frames/second}*21 \text{ words/frame}*32 \text{ bits/word}=67,200 \text{ bits/second}(67.2 \text{ Kbps}) \quad \text{EQ5}$$

The proper choice of parameters for an embodiment of the invention would be dependent upon the characteristics of the speech recognition system and, thus, the particular parameters with respect to frame size, coefficients per frame, and data word size may be selectively adapted as desired, according to the present invention.

In one particular embodiment of the invention as noted, a Bluetooth transceiver may be utilized for transmitting the coefficient data, utilizing data packets rather than voice. Thus, the present invention provides the reliable transfer of digital speech data 72 over a Bluetooth link utilizing data packets to provide higher quality voice data for a speech recognition system or other speech application, and also a reduced data rate for transmission over the Bluetooth link.

To provide reliable transfer of the digital speech data over the Bluetooth link, one embodiment of the invention uses the ACL link (instead of the typical voice SCO link) at the physical layer. Referring to FIG. 4, various different Bluetooth link types are illustrated along with the Bluetooth packet types suitable for such links and other characteristics along with the maximum data rate for asymmetric and symmetric transmission. As seen from FIG. 4, in a Bluetooth protocol, data packets transmitted over ACL links support retransmission. In that way, packets are not dropped, which might be critical for a speech recognition system. Therefore, in the present invention, ACL links are much more reliable and robust than SCO links for the purposes of speech signal transmission. The six types of data packets supported by a Bluetooth ACL link are shown in the table of FIG. 4. Data is carried in DH (Data High rate) and DM (Data Medium rate) packets. DM packets carry extra data but provide less error protection.

Generally, in a Bluetooth protocol, packets of information are transmitted on numbered time slots. The data packets may have various lengths spanning multiple slots. For example, a one-slot packet might be sent, whereas other packets may require three slots or five slots respectively. Shorter length packets (i.e., Dx1) provide lower data throughput, but are less susceptible to non-recoverable burst errors. Longer length packets, on the other hand (i.e., Dx5) provide higher data throughput, but are more susceptible to non-recoverable burst errors. In the present invention, the data packets are utilized to transmit voice information. Once the voice data (i.e. coefficient data) is generated, the Bluetooth protocol contains built in algorithms to monitor the quality and reliability of the link, and to determine which packet types are appropriate at any given time. That is, the Bluetooth transceiver 46 of FIG. 2 can determine which data packets are most appropriately sent in accordance with the principles of the present invention.

In any case, due to the reduced data rate necessary for high quality voice transmission utilizing the present invention, any type of ACL data packet transmitted in symmetric mode is capable of handling the data rate for the digital speech data 72. For example, for the embodiment of the invention discussed herein, a maximum rate of 67.2 Kbps is required. Any of the ACL packet types in the table of FIG. 4, in symmetric mode, is capable of supporting a bit rate of at least 108.8 kbps. Additionally, for asymmetric mode, at least three packet types (DM1, DH1, DH3) are capable of handling the maximum data rate in asymmetric mode.

In accordance with another aspect of the present invention, depending upon the desired system parameters, the invention can be parameterized in such a way that any of the ACL packets in either symmetric mode or asymmetric mode are capable of handling the link bandwidth. For example, 100 frames/second×21 words/frame×16 bits/word=33.6 kbps. This is less than the smallest maximum asymmetric rate of 36.3 kbps for a DM5 packet.

Once the coefficient data is determined, it is then transmitted by the wireless device to another device or system that has a suitable receiver. The received data is utilized for speech applications, such as speech recognition applications or other speech applications. As noted, autocorrelation coefficients may be utilized directly by the speech recognition system without additional computational complexity in the system. Various different speech recognition systems might be utilized as known by a person of ordinary skill in the art, and thus the present invention is not directed to a specific type of speech recognition system. Of course, those systems that are capable of directly handling the autocorrelation coefficient data as transmitted may be most desirable.

While the exemplary embodiment discussed herein is directed to transmitting the coefficient data to another device, as noted above, the wireless device, such as a headset, may also receive data. To that end, all the functional blocks of FIG. 2 support bidirectional data transfer. A receive data link, such as with a Bluetooth transceiver, may be implemented using an ACL link or an SCO link. If the received data link contains audio that will be listened to and interpreted by a human, the reduced quality of the SCO link may be acceptable, and standard Bluetooth audio processing can be performed by either the baseband processor 44 or digital processor 42 with the processed audio data being sent to codec 40 for playback over speaker 16. However, if a more reliable receive link is necessary or desired, as with the transmission link, then an ACL Bluetooth link may be employed. In such a case, the received audio data would be processed by the digital processor 42.

Another advantage of the present invention in using the autocorrelation coefficients as the speech representation and sending them as data is the ability to leverage this representation to reproduce the speech signal at the receiver, such as for replay or storage of the audio signals of the speech. With additional data bits representing a residual signal, the speech signal may be effectively regenerated, such as to be replayed in audio. This aspect of the invention is useful in various applications where the ability to collect the speech signal (or listen in) or the ability to recreate the audio speech is required, along with speech recognition capabilities of the invention. In the proposed implementation, the autocorrelation values that are generated by a transmitter (such as a headset) and sent to a receiver (such as a terminal) are used to generate a predictor to remove the redundancy in the speech signal and produce a residual signal. The residual is then encoded. Generally fewer bits per sample are needed for the residual signal than for the speech signal and respective coefficients (e.g. 2 to 4 bits per sample versus 16 bits per sample) The encoded residual signal is then transmitted to the receiver. At the receiver the residual signal is reconstructed from the encoded values, the redundancy of the speech signal is reinserted using the available autocorrelation values that were transmitted, and the speech signal is thus reproduced.

Figure 5:
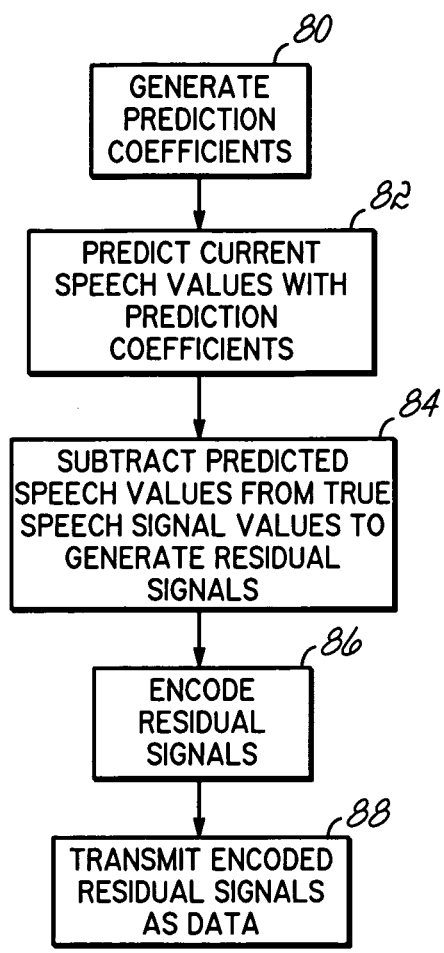
FIG. 5 is a flow chart illustrating another operational embodiment of the present invention.

Generally, the steps at the transmitter in accordance with one embodiment of the invention are as follows and as illustrated in the flowchart of FIG. 5:

1. Use the autocorrelation values to generate a set of prediction coefficients (step 80).
2. Use the prediction coefficients to predict current speech signal values from the previous values (step 82).
3. Subtract the predicted speech signal values from the true speech signal values to generate the residual signal (step 84).
4. Encode the residual signal values using 2-4 bits per sample (step 86).
5. Transmit the encoded residual signal to a receiver (step 88).

The prediction coefficients utilized in one embodiment of the invention for step 80 are established utilizing Linear Prediction, which would be known to a person of ordinary skill in the art. Specifically, in Linear Prediction, the prediction coefficients are related to the autocorrelation values by the following equations:

$$\sum_{k=1}^{p} a_i R(|i-k|) = R(i) \text{ for } 1 \le i \le p \quad \text{EQ 6}$$

wherein $a_i$ are the prediction coefficients;
R(i) are the autocorrelation coefficients;
and p is the number of prediction coefficients.

Usually the number of prediction coefficients p is one less than the number of correlation values available. So, for example, if you calculate 17 correlation values, R(0) through R(16), then p would equal 16. The above equations represent p linear equations in p unknowns. These equations may be solved in a variety of ways for the purposes of the invention. For example, matrix inversion, Gaussian elimination, a Levinson-Durbin algorithm, might be used. The method of solution generally does not change the resulting prediction coefficients (other than numerical round off errors).

The prediction coefficients are then used to generate a predicted speech signal per step 82 using the following equation:

$$\hat{s}(n) = \sum_{k=1}^{p} a_k s(n-k) \quad \text{EQ 7}$$

where $\hat{s}(n)$ is the predicted speech signal;
and s(n) is the original speech signal.

The residual speech signal e(n) is then defined as the difference between the original and predicted speech signals:

$$e(n) = s(n) - \hat{s}(n) \quad \text{EQ 8}$$

That is, as noted in step 84 of FIG. 5, the predicted speech signal values are subtracted from the true speech signal values to generate the residual speech signal.

The residual signal is then normalized by dividing each signal with a normalization factor G given by:

$$G = \sqrt{R(0) - \sum_{k=1}^{p} a_k R(k)} \quad \text{EQ 9}$$

The normalized residual signal is then encoded, as noted in step 86, using a desirable number of bits (e.g., 2-10 bits) that might be determined by the design and the desired quality of the audio reproduction. Four (4) bits may be desired, although fewer, such as 2 bits may also be possible. If 2-4 bits per sample are utilized, it would represent great savings compared to the 16 bits per sample used to represent the original speech signal. At 11,025 samples per second, the bit rate for transmitting the speech signal values is reduced from 176,400 bits per second to 22050 to 44100 bits per second. The encoded residual is then transmitted to the receiver in accordance with the methodology as outlined hereinabove and step 88 of FIG. 5. That is, the residual values are transmitted using data parameters, such as Bluetooth data configurations using suitable packet types and parameters as discussed above and depending upon the ultimate bit rate requirement. The final choice of bit rate to use depends on the desired quality and the application of the reconstructed speech signal.

The steps at the receiver in accordance with one embodiment of the invention are then:

1. Use the autocorrelation values to generate a set of prediction of coefficients
2. Use the prediction coefficients to predict current speech signal values from the previous values
3. Add the predicted speech signal values to the residual signal to generate a representation of the original speech values.

The prediction coefficients are generated in the receiver, such as a terminal, generally exactly as they were generated in the transmitter, such as a headset, since they are derived from the same autocorrelation values. Also the normalization value G is calculated as shown above. The received residual signal is decoded and multiplied by G to remove the effect of the normalization.

For those applications requiring audio, the speech signal is regenerated, such as to transmit it or play it back as an audio signal, by adding the predicted value of speech to the received residual signal using the following equation:

$$\tilde{s}(n) = e(n) + \sum_{k=1}^{p} \tilde{s}(n-k) \quad \text{EQ 10}$$

where $\tilde{s}(n)$ is the reconstructed speech signal.

This aspect of the invention takes advantage of the availability of autocorrelation values at the receiver, according to the invention as described herein, to reduce the number of bits per sample needed to represent the speech signal and reproduce the speech signal at the receiver or elsewhere. The approach is based on the well-known Linear Prediction method of speech representation. This method is the source of many approaches to speech coding. In accordance with one embodiment of the invention, a specific methodology is described herein, however other approaches may also be used. That is, while a basic method is described, the invention contemplates the use of other Linear-Prediction based methods. Of course, as noted above, where audio is not necessary at the receiver site, the data, such as the autocorrelation coefficients may be used directly for speech recognition applications.

While the present invention has been illustrated by a description of various embodiments and while these embodiments have been described in considerable detail, it is not the intention of the applicant to restrict or in any way limit the scope of the appended claims to such detail. Additional advantages and modifications will readily appear to those skilled in the art. The invention in its broader aspects is therefore not limited to the specific details, representative apparatus and method, and illustrative examples shown and described. Accordingly, departures may be made from such details without departing from the spirit or scope of applicant's general inventive concept.

What is claimed:

1. A wireless device for use with a separate processing device that runs speech recognition applications, the wireless device comprising:
    speech processing circuitry for providing initial speech processing of audio captured from a user and including a frame generator for generating successive frames from digitized audio signals that are reflective of the audio signals captured from the user, the frames representing portions of the digitized audio signals; and
    autocorrelation circuitry for generating a set of coefficients for each frame, the coefficient set containing information about spectral characteristics of the audio signal portion represented by the frame;
    processing circuitry configured for transforming the set of coefficients into data in a Bluetooth data packet type instead of a voice packet type for wireless transmission;
    a Bluetooth transceiver configured for transmitting the set of coefficients as data in the Bluetooth data packet type and configured for using an asynchronous connectionless (ACL) link with a separate processing device for transmitting the set of coefficients to the processing device;
    wherein the separate processing device utilizes the coefficients for further processing for speech recognition applications.

2. The wireless device of claim 1, the speech processing circuitry including an A/D circuit for sampling an audio signal captured by the headset to form the digitized audio signals.

3. The wireless device of claim 2 wherein the A/D circuit is configured for sampling at a rate in the range of 11 KHz to 48 KHz.

4. The wireless device of claim 1, the speech processing circuitry including pre-emphasis circuitry to emphasize higher frequency components of the digitized audio signals.

5. The wireless device of claim 4 wherein the pre-emphasis circuitry includes a filter.

6. The wireless device of claim 1 wherein the frame generator generates successive overlapping frames.

7. The wireless device of claim 6 wherein the frames overlap with successive frames in an amount in the range of 0% to 50%.

8. The wireless device of claim 1 wherein the frames generated are in the range of 10 ms to 100 ms in size.

9. The wireless device of claim 1, the speech processing circuitry including windowing circuitry for adjusting the digitized audio signals at the edges of the successive frames.

10. The wireless device of claim 1 wherein the autocorrelation circuitry generates a number of coefficients for each frame in the range of 10 to 21.

11. The wireless device of claim 1 wherein generated coefficients have a data size in the range or 16 to 32 bits per coefficient.

12. A wireless device for use with a separate processing device that runs speech recognition applications, the wireless device comprising:
    digital signal processing circuitry for providing initial speech processing and configured to generate sets of coefficients from digitized audio signals that are reflective of audio signals captured from the user, the coefficients containing information about spectral characteristics of portions of the digitized audio signals;
    processing circuitry for transforming the sets of coefficients into data in a Bluetooth data packet type instead of a voice packet type for wireless transmission;
    a Bluetooth transceiver configured for transmitting the sets of coefficients as data in the Bluetooth data packet type and configured for using an asynchronous connectionless (ACL) link with a separate processing device for transmitting the set of coefficients to the processing device;
    wherein the separate processing device utilizes the coefficients for further processing for speech recognition applications.

13. The wireless device of claim 12 wherein the digital signal processing circuitry is configured for generating successive frames from digitized audio signals, the frames representing portions of the digitized audio signal.

14. The wireless device of claim 13 wherein the frames generated are in the range of 10 ms to 100 ms in size.

15. The wireless device of claim 12 wherein the digital signal processing circuitry pre-emphasizes higher frequency components of the digitized audio signals prior to generating the sets of coefficients.

16. The wireless device of claim 13 wherein the digital signal processing circuitry is configured to perform a windowing application on the successive frames of the digitized audio signals for adjusting the digitized audio signals at the edges of the successive frames.

17. The wireless device of claim 13 wherein the digital signal processing circuitry generates a number of coefficients for each frame in the range of 10 to 21.

18. The wireless device of claim 12 wherein the generated coefficients have a data size in the range or 16 to 32 bits per coefficient.

19. A wireless headset for use with a processing device that runs speech applications, the headset comprising:
    a microphone to capture audio signals from a user;
    digital signal processing circuitry for providing initial speech processing and configured to generate sets of coefficients from digitized audio signals that are reflective of the audio signals captured from the user, the coefficients containing information about spectral characteristics of portions of the digitized audio signals;

processing circuitry for transforming the set of coefficients into data in a Bluetooth data packet type instead of a voice packet type for wireless transmission;

a Bluetooth transceiver configured for transmitting the sets of coefficients in the Bluetooth data packet type and configured for using an asynchronous connection-less (ACL) link with a separate processing device for transmitting the set of coefficients to the processing device;

wherein the separate processing device utilizes the coefficients for further processing for speech applications.

20. The wireless headset of claim 19 wherein the digital signal processing circuitry is configured for generating successive frames from digitized audio signals, the frames representing portions of the digitized audio signals.

21. The wireless headset of claim 20 wherein the frames generated are in the range of 10 ms to 100 ms in size.

22. The wireless headset of claim 19 wherein the digital signal processing circuitry pre-emphasizes higher frequency components of the digitized audio signals prior to generating the sets of coefficients.

23. The wireless headset of claim 20 wherein the digital signal processing circuit is configured to perform a windowing application on the successive frames of the digitized audio signal for adjusting the digitized audio signal at the edges of the successive frames.

24. The wireless headset of claim 20 wherein the digital signal processing circuitry generates a number of coefficients for each frame in the range of 10 to 21.

25. The wireless headset of claim 19 wherein the generated coefficients have a data size in the range or 16 to 32 bits per coefficient.

26. A method of transmitting voice information over a wireless link from one device to a separate processing device for use in speech recognition applications, the method comprising:

capturing audio signals from a user with the one device and providing initial speech processing by digitizing the audio signals; and generating a set of autocorrelation coefficients from the digitized audio signals, the coefficient set containing information about spectral characteristics of the audio signals;

processing the coefficients for transforming the set of coefficients into data in a Bluetooth data packet type instead of a voice packet type for wireless transmission;

with a Bluetooth transceiver, transmitting the set of coefficients as data in the Bluetooth data packet type to a separate processing device using an asynchronous connection-less (ACL) link with the separate processing device;

utilizing the coefficients in the separate processing device for further processing for speech recognition applications.

27. The method of claim 26 wherein the initial speech processing further includes generating successive frames from a digitized version of the audio signals, the frames representing portions of the digitized audio signals.

28. The method of claim 27 further comprising generating successive overlapping frames.

29. The method of claim 28 wherein the frames overlap with successive frames in an amount in the range of 0% to 50%.

30. The method of claim 26 wherein the initial speech processing further includes pre-emphasizing higher frequency components of the digitized audio signals prior to generating a set of autocorrelation coefficients.

31. The method of claim 27 wherein the frames generated are in the range of 10 ms to 100 ms in size.

32. The method of claim 27 wherein the initial speech processing further includes performing a windowing operation on the frames for adjusting the digitized audio signals at the edges of the successive frames.

33. The method of claim 27 further comprising generating the autocorrelation coefficients with a number of coefficients for each frame in the range of 10 to 21.

34. The method of claim 26 wherein generated coefficients have a data size in the range or 16 to 32 bits per coefficient.

35. A wireless device for use with a separate processing device that runs speech recognition applications, the wireless device comprising:

speech processing circuitry for providing initial speech processing and including conversion circuitry for digitizing original audio signals to form digitized audio signals; and autocorrelation circuitry for generating a set of coefficients from the digitized audio signals, the coefficient containing information about spectral characteristics of the audio signals;

processing circuitry using the autocorrelation coefficients for generating a predicted version of the audio signals and to subtract the predicted version from the original audio signals to generate residual signals;

processing circuitry for transforming the set of coefficients and residual signals into data in a Bluetooth data packet type instead of a voice packet type for wireless transmission;

a Bluetooth transceiver configured for transmitting the set of coefficients and the residual signals as data in the Bluetooth data packet type and configured for using an asynchronous connection-less (ACL) link with a separate processing device for transmitting the set of coefficients and residual signals to the processing device;

wherein the separate processing device utilizes the coefficients and the residual signals data for further processing for speech recognition applications.

36. The wireless device of claim 35 wherein the processing circuitry generates prediction coefficients for the predicted version of the audio signals.

37. The wireless device of claim 35 wherein the processing circuitry is configured for normalizing the residual signals.

38. The wireless device of claim 35 further comprising encoding circuitry for encoding the residual signals for transmission.

39. The wireless device of claim 38 further wherein the encoding circuit encodes the residual signals with 2-10 bits.

40. A wireless system for use with speech applications comprising:

a transmitter including speech processing circuitry for providing initial speech processing, the speech processing circuitry configured for digitizing original audio signals and generating a set of autocorrelation coefficients from the digitized audio signals that contain information about spectral characteristics of the audio signals, the speech processing circuitry further configured for generating predicted versions of the audio signals from the autocorrelation coefficients and for subtracting the predicted versions from the original audio signals to generate residual signals, the processing circuitry configured for transforming the set of coefficients and residual signals into data in a Bluetooth data packet type instead of a voice packet type for wireless transmission;

a Bluetooth transceiver configured for transmitting the set of autocorrelation coefficients and the residual signals as data in the Bluetooth data packet type and configured for using an asynchronous connection-less (ACL) link with a separate processing device for transmitting the set of coefficients and residual signals to the separate processing device; and the processing device having a receiver for receiving the data, the processing device configured for utilizing the autocorrelation coefficients and residual signals data for further processing for speech applications.

41. The system of claim 40 wherein the processing device is configured to use the autocorrelation coefficients and residual signals data for speech recognition applications.

42. The system of claim 40 wherein the processing device is configured for using the autocorrelation coefficients and residual signals to recreate audio signals reflective of the original audio signals.

43. The system of claim 42 wherein the processing device is configured for using the autocorrelation coefficients to generate predicted versions of the audio signals and then to add the predicted versions to the residual signals to recreate audio signals reflective of the original audio signals.

44. A method of transmitting voice information over a wireless link from one device to a separate processing device for use in speech applications, the method comprising:

capturing an original audio signal with the one device and providing initial speech processing by digitizing the audio signal; and generating a set of autocorrelation coefficients from the digitized audio signal, the autocorrelation coefficient set containing information about spectral characteristics of the audio signal;

generating a predicted version of the audio signals with the autocorrelation coefficients and subtracting the predicted version from the original audio signals to generate residual signals;

processing the coefficients and residual signals for transforming them into data in a Bluetooth data packet type instead of a voice packet type for wireless transmission;

with a Bluetooth transceiver, transmitting the set of coefficients and the residual signals as data in the Bluetooth data packet type to a separate processing device using an asynchronous connection-less (ACL) link with the separate processing device where the autocorrelation coefficients and residual signals data are utilized by the processing device for speech applications.

\* \* \* \* \*

UNITED STATES PATENT AND TRADEMARK OFFICE
CERTIFICATE OF CORRECTION

PATENT NO. : 8,417,185 B2  
APPLICATION NO. : 11/303271  
DATED : April 9, 2013  
INVENTOR(S) : Keith Braho et al.

Page 1 of 2

It is certified that error appears in the above-identified patent and that said Letters Patent is hereby corrected as shown below:

In Column 2, Title Page, Abstract Line 10 reads ". . . to generate residual signals A Blue- . . ." and should read -- . . . to generate residual signals. A Blue- . . . --.

In the Specifications

In Column 1, Lines 37-38 reads ". . . is a well; known protocol . . ." and should read -- . . . is a well-known protocol . . . --.

In Column 3, Line 45 reads ". . . which are general utilized to . . ." and should read -- which are generally utilized to . . . --.

In Column 4, Line 11 reads ". . . used in accordance with aspect of the . . ." and should read -- used in accordance with aspects of the . . . --.

In Column 4, Lines 61-62 reads ". . . system, for example, that application is . . ." and should read -- . . . system, for example; that application is . . . --.

In Column 5, Line 5 reads ". . . or maybe implemented . . ." and should read -- . . . or may be implemented . . . --.

In Column 9, Line 10 reads ". . . features general referred . . ." and should read -- . . . features generally referred . . . --.

In the Claims

In Column 14, Line 13, CLAIM 11 reads ". . . in the range or 16 to 32 bits per . . ." and should read -- . . . in the range of 16 to 32 bits per . . . --.

Signed and Sealed this  
Twenty-second Day of April, 2014

Michelle K. Lee  
*Deputy Director of the United States Patent and Trademark Office*

CERTIFICATE OF CORRECTION (continued)
U.S. Pat. No. 8,417,185 B2

In Column 14, Line 55, CLAIM 18 reads ". . . in the range or 16 to 32 bits per . . ." and should read -- . . . in the range of 16 to 32 bits per . . . --.

In Column 15, Line 30, CLAIM 25 reads ". . . in the range or 16 to 32 bits per . . ." and should read -- . . . in the range of 16 to 32 bits per . . . --.

In Column 16, Line 11, CLAIM 34 reads ". . . in the range or 16 to 32 bits per . . ." and should read -- . . . in the range of 16 to 32 bits per . . . --.